US012589507B2

(12) United States Patent
Gazeau et al.

(10) Patent No.: US 12,589,507 B2
(45) Date of Patent: Mar. 31, 2026

(54) ROBOTIC HAND SENSITIVE TO FORCES IN AN AQUATIC ENVIRONMENT

(71) Applicants: CENTRE NATIONAL DE LA RECHERCHE SCIENTIFIQUE, Paris (FR); UNIVERSITE DE POITIERS, Poitiers Cedex (FR)

(72) Inventors: Jean-Pierre Gazeau, Chatellerault (FR); Pierre Laguillaumie, Buxerolles (FR); Philippe Vulliez, Lavoux (FR); Camille Mizera, Poitiers (FR)

(73) Assignees: CENTRE NATIONAL DE LA RECHERCHE SCIENTIFIQUE, Paris (FR); UNIVERSITE DE POITIERS, Poitiers (FR)

( * ) Notice: Subject to any disclaimer, the term of this patent is extended or adjusted under 35 U.S.C. 154(b) by 958 days.

(21) Appl. No.: 17/757,351

(22) PCT Filed: Dec. 15, 2020

(86) PCT No.: PCT/EP2020/086291
§ 371 (c)(1),
(2) Date: Jun. 14, 2022

(87) PCT Pub. No.: WO2021/122648
PCT Pub. Date: Jun. 24, 2021

(65) Prior Publication Data
US 2023/0033779 A1 Feb. 2, 2023

(30) Foreign Application Priority Data
Dec. 17, 2019 (FR) ...................................... 1914606

(51) Int. Cl.
*B25J 15/00* (2006.01)
*B25J 9/10* (2006.01)
(Continued)

(52) U.S. Cl.
CPC ........... *B25J 15/0009* (2013.01); *B25J 9/104* (2013.01); *B25J 15/10* (2013.01); *B25J 19/021* (2013.01)

(58) Field of Classification Search
CPC ........ B25J 15/0009; B25J 9/104; B25J 15/10; B25J 19/021; B25J 13/082; B25J 13/088; B25J 19/0083
See application file for complete search history.

(56) References Cited

U.S. PATENT DOCUMENTS 2,435,614 A * 2/1948 Tureman, Jr. ........... A61F 2/583
623/64
3,413,658 A * 12/1968 Becker .................... A61F 2/583
623/64

(Continued)

FOREIGN PATENT DOCUMENTS

FR 3027246 A1 4/2016
JP 2005-014166 * 1/2005

OTHER PUBLICATIONS

French Search Report received for Application No. 1914606, dated Sep. 2, 2020.

(Continued)

*Primary Examiner* — William A. Rivera
(74) *Attorney, Agent, or Firm* — Greer, Burns & Crain, Ltd

(57) ABSTRACT

A device forming a robotic hand, including a base forming a hand palm, at least two articulated structures each forming a robotic finger, each articulated structure being connected to the base by at least one articulation, at least one drive mechanism for each articulation, at least one actuator arranged to actuate the at least one drive mechanism by means of at least one flexible drive link connecting and driving the at least one drive mechanism, structure for measuring the pivoting of the at least one actuator and one (Continued)

or more of the articulations, a glove covering the base and the at least two articulated structures, the glove being closed so as to form, inside the glove, a volume filled with oil between the wall of the glove and the base and the at least two articulated structures. Robotic hands used in aquatic environments at great depths are also disclosed.

12 Claims, 9 Drawing Sheets

(51) Int. Cl.
    *B25J 15/10*         (2006.01)
    *B25J 19/02*         (2006.01)

(56)          References Cited

U.S. PATENT DOCUMENTS

| | | | | |
|---|---|---|---|---|
| 3,604,017 A | * | 9/1971 | Brown | A61F 2/583 |
| | | | | 623/64 |
| 4,715,638 A | * | 12/1987 | Chambers | B25J 19/0029 |
| | | | | 294/198 |
| 5,967,580 A | * | 10/1999 | Rosheim | B25J 17/0275 |
| | | | | 901/29 |
| 9,101,499 B2 | * | 8/2015 | Haggas | A61F 2/586 |
| 9,568,074 B2 | | 2/2017 | Gosselin | |
| 9,669,551 B1 | * | 6/2017 | Salisbury | B25J 15/0009 |
| 9,981,831 B2 | * | 5/2018 | Terzuolo | B66C 3/14 |
| 2011/0130879 A1 | * | 6/2011 | Abdallah | B25J 9/1692 |
| | | | | 700/260 |
| 2012/0109379 A1 | * | 5/2012 | Abdallah | B25J 9/1045 |
| | | | | 700/260 |
| 2014/0222199 A1 | * | 8/2014 | Ihrke | B25J 15/0009 |
| | | | | 294/200 |

OTHER PUBLICATIONS

International Search Report and Written Opinion received for PCT/EP2020/086291, mailed Mar. 12, 2021.

Emburg, J., et al., "A small-scale actuator with passive-compliance for a fine-manipulation deep-sea manipulator," IEEE, 2011, 4 pages.

* cited by examiner

[Fig.1]

[Fig.2]
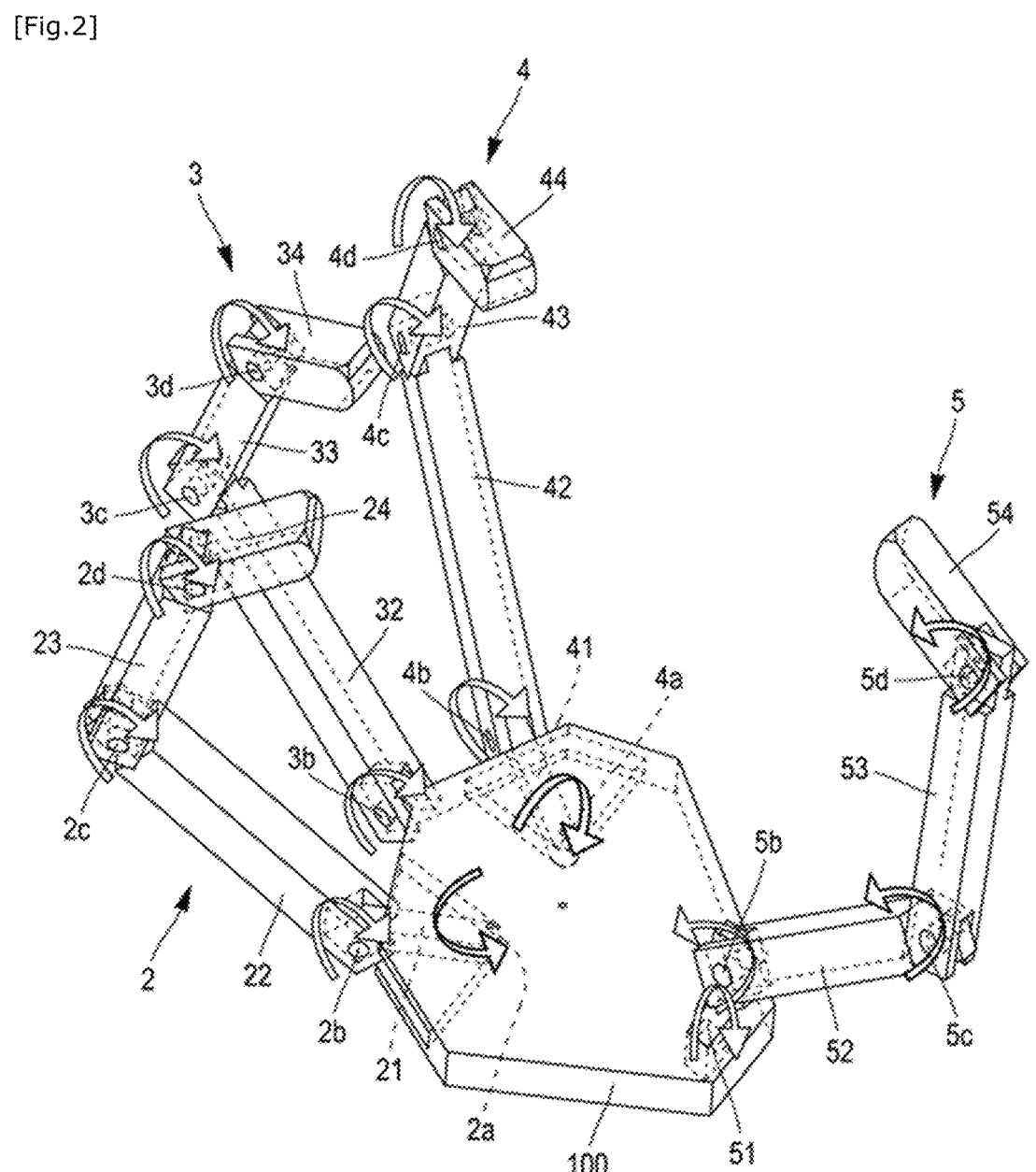

[Fig.3]
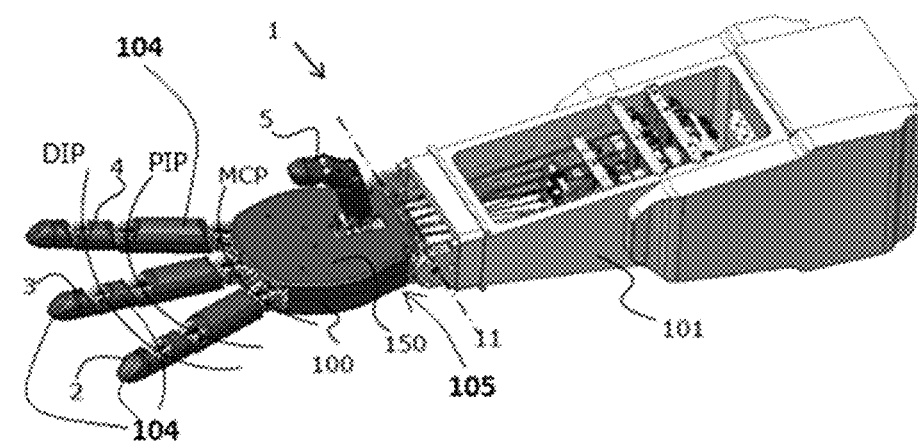
[Fig.4]
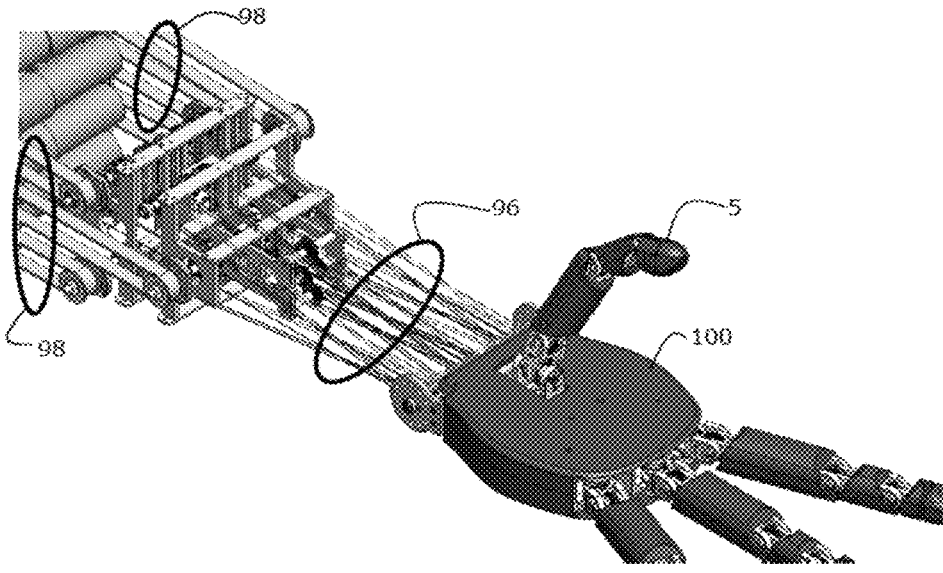
[Fig.5]
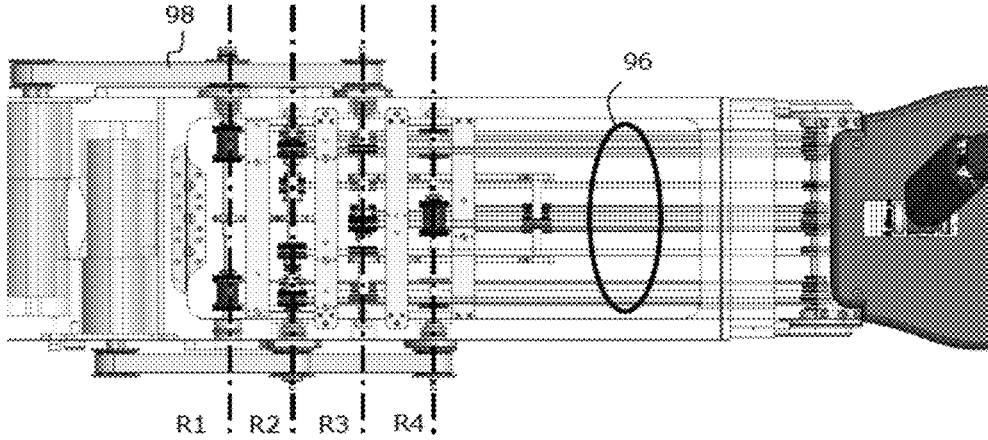

[Fig.6]
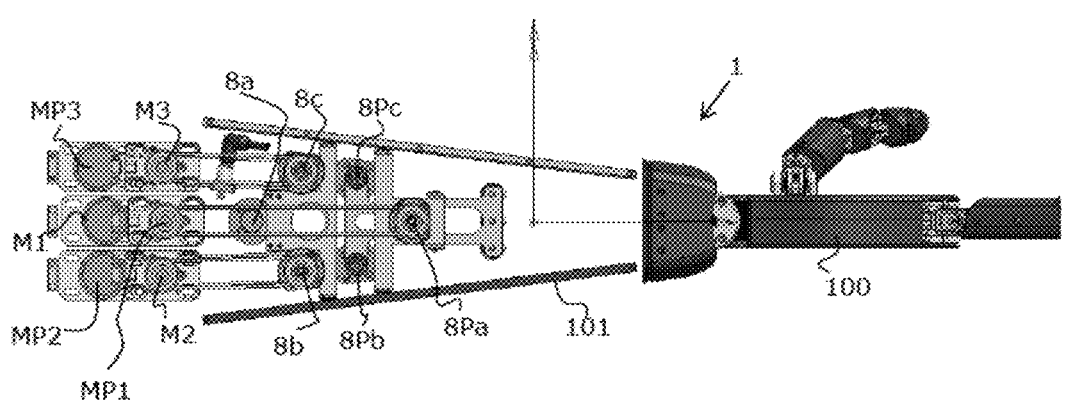
[Fig.7]
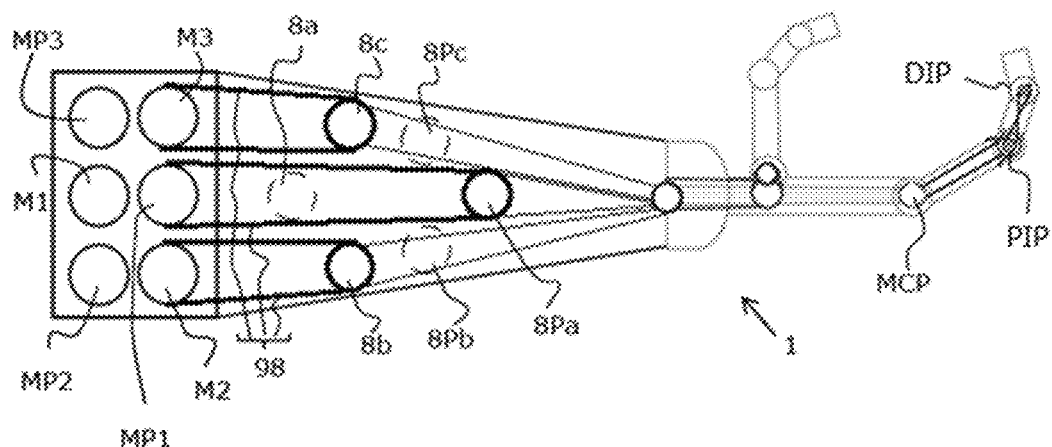
[Fig.8]
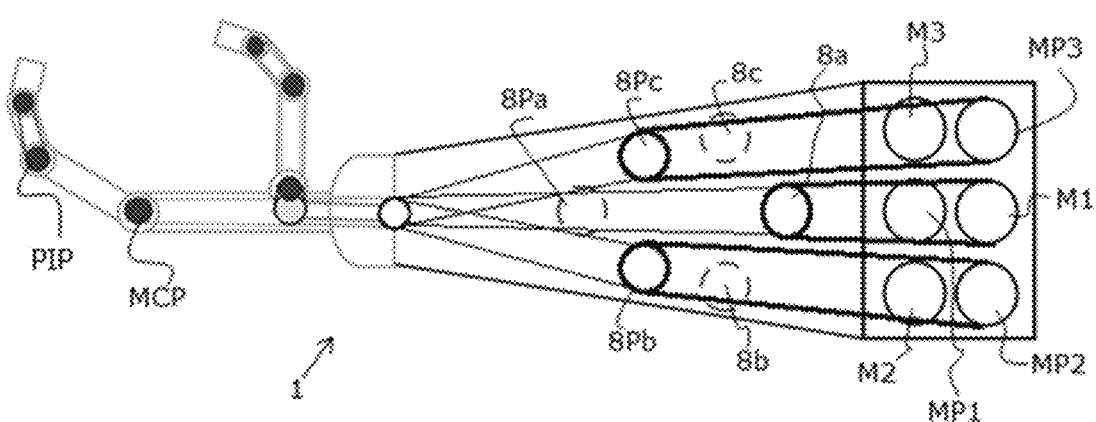

[Fig.9]

[Fig.10]
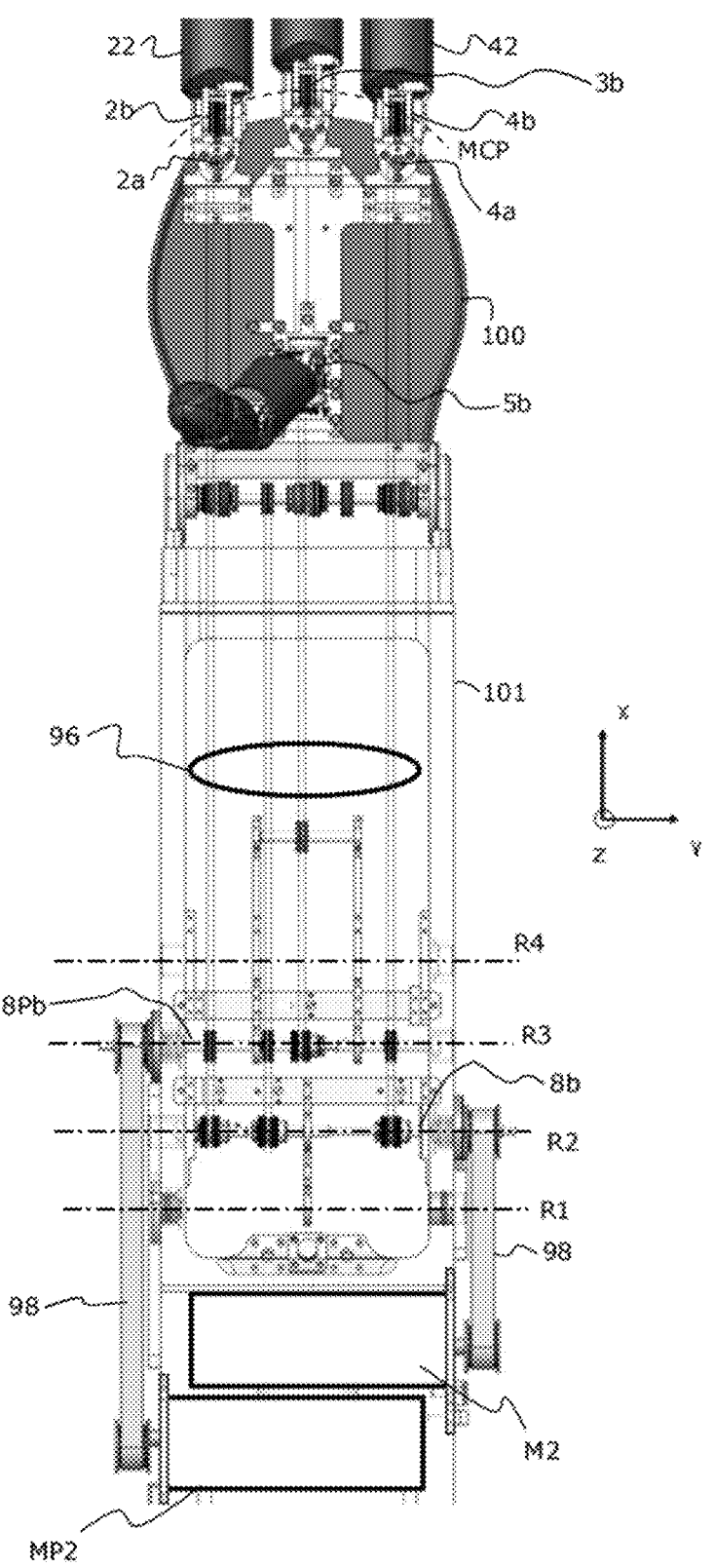

[Fig.11]
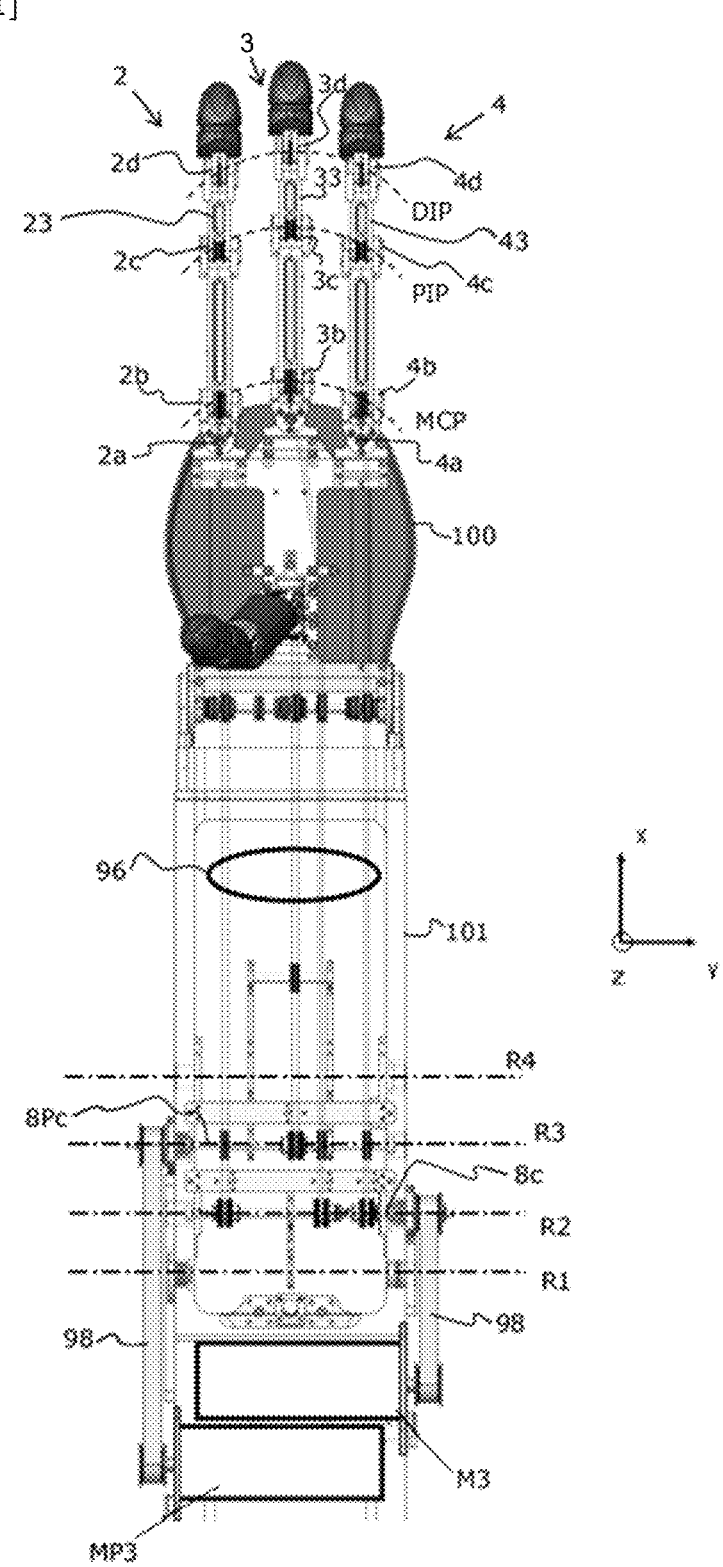

[Fig.12]
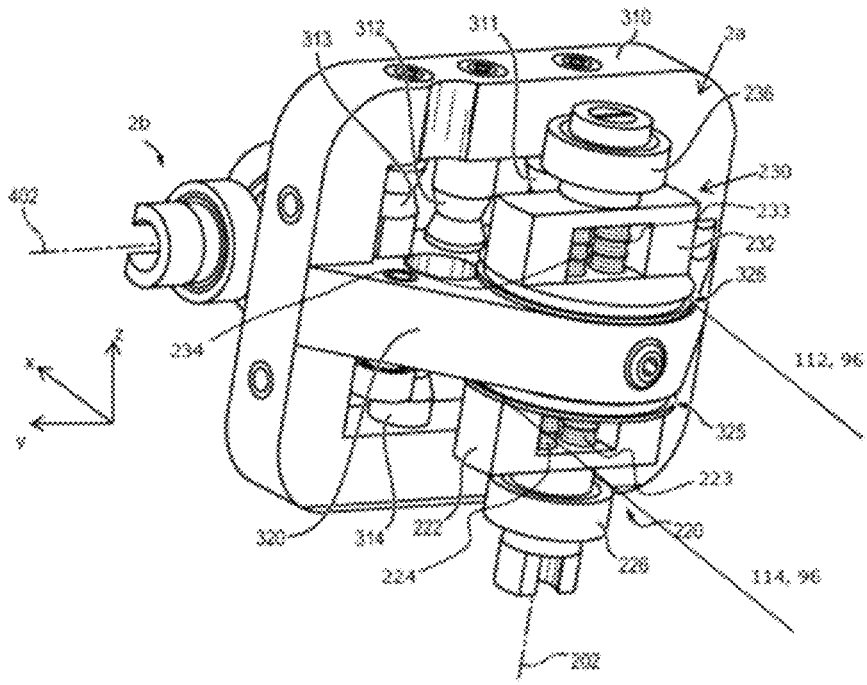
[Fig.13]
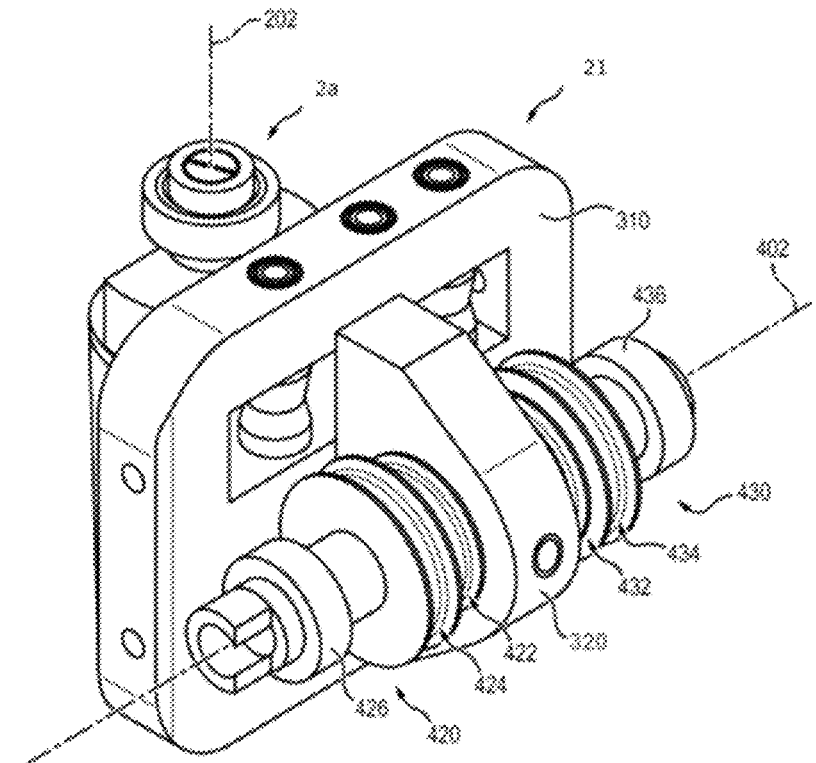

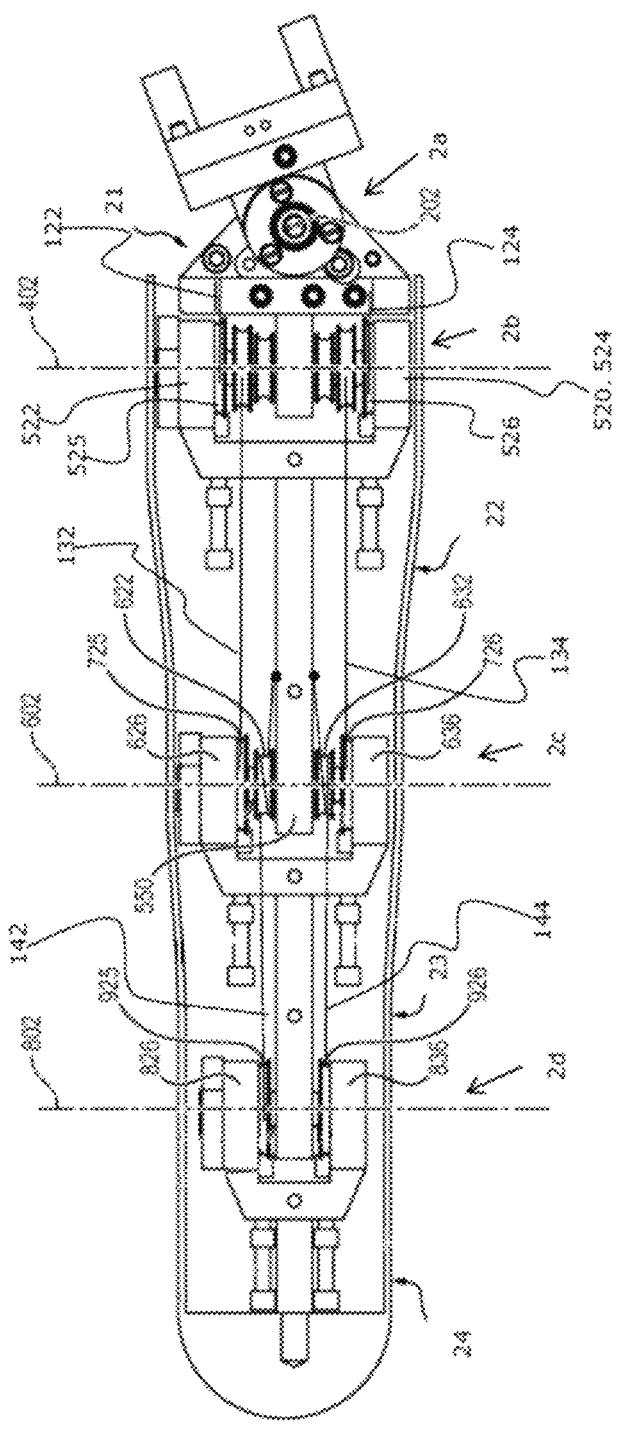
[Fig.14]

ROBOTIC HAND SENSITIVE TO FORCES IN AN AQUATIC ENVIRONMENT

BACKGROUND

The present invention relates to the field of robotic hands used in an aquatic environment, in particular at a great depth, and for gripping fragile objects.

The production of robotic fingers or hands is a crucial issue in many fields.

From document FR 3 027 246, a robotic hand is known comprising four robotic fingers, including a thumb, each finger having several articulations, each being actuated by means of a system of cables and pulleys and by an electric actuator. The thus-developed robotic hand has four actuators per finger. With regard to the state of the prior art, this arrangement makes it possible to decrease the number of actuators needed to move the fingers and thus to reduce the weight and size of the robotic hands.

This type of device is only usable in an air or ground environment alone.

In a marine environment, manipulators of different types are known, for example:

- of the type comprising a gripper formed by two cylinder-actuated jaws, this manipulator being able to be used at a depth of 300 metres,
- of the type comprising a gripper with jaws produced from a soft and hollow material which can be actuated pneumatically or from a flexible material reinforced with fibres which can be actuated hydraulically, this type of manipulator being able to be used at a depth of 100 metres,
- of the type comprising a gripper formed by three hydraulically actuated jaws, comprising strain gauges arranged on the finger phalanges, in particular at the end of a finger, in order to directly estimate a clamping force, this type of manipulator not measuring the position of the articulations,
- of the type comprising a gripper formed by two jaws, each being connected to the frame via an arm, each arm being actuated by a first motor so as to be able both to pivot and to move along a rod fastened to the frame, each jaw being actuated by a second motor borne [by] said arm so as to pivot relative to an end of said arm, each jaw comprising three optoelectronic sensors aligned on the surface of said jaw in order to measure a normal compression force, each jaw being covered by a membrane so that an oil is enclosed between the jaw and the membrane, this manipulator being able to be used at a depth of 100 metres.

However, these types of manipulator are only usable at a small depth, and are steered into position by an operator via a visual feedback by camera. In the case where there is no deformation sensor or gauge, the operator cannot control the clamping force. In the case where the manipulator is equipped with deformation sensors or gauges, these do not make it possible to perform a reliable measurement of the clamping force because of the pressure exerted by the external environment at greater depths in particular when the pressure increases.

In a marine environment, in particular at a great depth, a manipulator of the type comprising an articulated arm at the end of which a gripper formed by two jaws is located is known, the assembly being actuated hydraulically, potentiometers being arranged close to the articulations in order to acquire their position. This type of manipulator is provided for depths ranging up to 6000 metres. Likewise, this manipulator is steered via a visual feedback by camera, such that it is not possible to control the clamping force.

Yet controlling the clamping force on an object is vital, in particular during archaeological digs.

It is thus desirable to produce a robotic hand arrangement making it possible to grip fragile objects in an aquatic environment, in particular at a great depth.

In particular, an aim of the invention is to control and/or increase the reliability of the measurement of the clamping effort by a robotic hand in an aquatic environment.

Another aim of the invention is both to reduce the weight and size of a robotic hand and to restrain the size of said hand so that it resembles a human hand as much as possible and it is easier for a human to use. Another aim of the invention is to simplify the actuation of the robotic hands.

SUMMARY

According to a first aspect of the invention, at least one of the above-mentioned aims is achieved with a device forming a robotic hand comprising:

- a base forming a hand palm,
- at least two articulated structures each forming a robotic finger, each articulated structure being functionally connected to the base and comprising at least one articulation, so as to move said articulated structure with respect to the base,
- at least one drive mechanism for moving each articulation,
- at least one actuator arranged to actuate the at least one drive mechanism by means of at least one flexible drive link connecting and driving the at least one drive mechanism,
- means for measuring the pivoting of the at least one actuator and one or more of said articulations,
- a glove covering the base and the at least two articulated structures, the glove being closed so as to form, inside said glove, a volume filled with oil between the wall of the glove and the base and the at least two articulated structures.

The device according to the invention has the advantage of being able to control the clamping force at a great depth (2000 metres) and thus of being able to grasp very fragile objects. It moreover makes it possible to significantly reduce the size and weight of a robotic hand and at the same time to improve the aesthetics thereof so that it resembles a human hand. The thus-proposed robotic hand is more efficient than the robotic hands of the prior art.

For the above and/or for the following in the description:

- by articulated structure is meant a structure element connected to the base by an articulation, or an assembly of structure elements connected end to end by an articulation, with one structure element of the assembly of structure elements connected to the base by an articulation, each element being arranged and configured to form a phalange of a robotic finger, an articulated structure forming a robotic finger; in the following, articulated structure or finger may be used equally,
- by structure element is meant a part connecting two articulations by its two opposite ends, or a part connecting one articulation by one of its two opposite ends, the structure element being able to have a slender shape so as to produce a phalange of a robotic finger,
- by articulation is meant a mechanical connection producing at least one relative rotational movement between two structure elements or between the base and one structure element, by two articulations of different types and/or with different functions is meant two distinct mechanical connections, a first mechanical connection and a second mechanical connection, each producing at least one relative rotational movement between two structure elements or between the base and one structure element, by different types of articulation is meant articulations having, as the difference, a different axis of rotation, for example axes of rotation not parallel to one another, or axes of rotation orthogonal to one another, by different articulation functions is meant articulations defined by positions spaced apart from one another, for example separated by a structure element, such that, in the context of two articulations, the first articulation fulfils a first function, called first bending function, and the second articulation fulfils a second function, called second bending function, by a flexible link is meant a structural link having the form of a cable or a strap, by a flexible actuation link is meant a structural link having the form of a strap and not being elastic, by a flexible drive link is meant a structural link having the form of a cable and being elastic.

Preferably, the measurement means comprise an incremental encoder, or optical sensor, arranged on each actuator. Each sensor makes it possible to measure an angular position of the axis of rotation of the actuator. The measurement means comprise a potentiometer arranged on each axis of articulation. Each potentiometer makes it possible to measure an angular position between two phalanges or between the base and a first phalange. The potentiometer is of the type arranged to return an electrical signal depending on the position of said articulation. The difference between the measurement by the potentiometers and the measurement by the incremental encoders (or optical sensors) makes it possible to obtain the extension of the flexible links (for example the cables). By associating each flexible link with a spring and knowing the elastic constant (or modulus of elasticity) of said flexible link, it is possible to calculate the effort borne by each flexible link using the following equation: $F=k \cdot x$; $F$ being the effort borne by the flexible link, $k$ being the elastic constant, $x$ being the extension of the flexible link.

The calculation of the clamping efforts will be described more below. These measurement means have the advantages of being simple and reliable. Moreover, as the fingers and the potentiometers are immersed in oil, which makes it possible to compensate for the pressure of the aquatic environment, no additional pressure will be applied to the phalanges of the fingers, since the internal pressure and the external pressure are identical such that the measurements of the clamping of the fingers will be equally reliable.

According to an embodiment, the glove is produced with a material containing silicone. The glove can be constituted mostly or entirely by silicone elastomer. The silicone makes it possible to increase the adhesion between the tips of the fingers and the objects. Preferably, the wall of the glove has a thickness of two millimetres. Preferably, the wall of the glove has a Shore A hardness comprised between 10 and 40, preferably of 20. This choice offers a compromise between watertightness and flexibility so as to make it possible to move the fingers unencumbered.

Preferably, the device comprises at least one shell having a rounded shape and placed between each articulation of the at least one articulated structure, so as to locally produce a support for the wall of the glove. According to an embodiment, one shell is arranged on each phalange. Preferably, the at least one shell is rigid. It can be produced from at least two parts which can be assembled around a phalange, for example by screwing or by being fitted together.

According to optional improvements of the invention:

at least one intermediate drive shaft in order to return the movement of the at least one actuator, arranged functionally between the at least one actuator and the at least one actuated drive mechanism, so that:

the at least one intermediate drive shaft is actuated by an actuator, and the at least one intermediate drive shaft is functionally connected to at least two distinct drive mechanisms, each drive mechanism being functionally connected to said intermediate drive shaft by means of the at least one flexible drive link, at least one intermediate drive shaft is functionally connected to at least two drive mechanisms, each mechanism being arranged functionally on a distinct articulated structure; this characteristic makes it possible to synchronize two articulations of two distinct articulated structures, the at least two articulated structures each comprise at least two structure elements and at least two articulations of different types and/or with different functions, which are functionally connected to one another in order to form a robotic finger with at least two articulations, the at least one intermediate drive shaft being functionally connected to at least two drive mechanisms associated with an articulation of the same type and/or with the same function, each mechanism being arranged on a distinct articulated structure; this characteristic makes it possible to synchronize two articulations of the same type of at least two distinct articulated structures, the at least two articulated structures are substantially identical and each comprise at least two structure elements and at least two articulations of different types and/or with different functions, which are functionally connected to one another in order to form a robotic finger with at least two articulations, the assembly of the at least two articulated structures defining at least two rows of articulations of the same type and/or with the same function, the at least one intermediate drive shaft being functionally connected to at least two drive mechanisms associated with an articulation of the same row, each mechanism being arranged on a distinct articulated structure; this characteristic makes it possible to synchronize two articulations of the same row of at least two distinct articulated structures, the at least two articulated structures each comprise at least two structure elements and at least two articulations of different types and/or with different functions, which are functionally connected to one another in order to form a robotic finger with at least two articulations, and the at least two articulations are coupled to one another by means of a flexible connection link, preferably the at least two articulations are consecutive; this characteristic makes it possible to simplify the drive of the articulations, the at least one actuator is associated with a single intermediate drive shaft, the at least one actuator comprises an axis of rotation which is parallel to and non-coaxial with the axis of the at least one intermediate drive shaft, so that each intermediate drive shaft is actuated by an actuator by means of at least one flexible actuation link, the device comprises at least two actuators, a first actuator and a second actuator, arranged in parallel and one next to the other, of which the second actuator has a rotating shaft emerging from a side opposite that of the first actuator; this characteristic makes it possible to limit the size of the device forming a robotic hand all the more, the device forming a robotic hand comprises four articulated structures forming four robotic fingers, in particular four robotic fingers arranged, with respect to the base, so that three robotic fingers can be substantially aligned with one another and parallel to the geometric plane passing through the base, preferably one of the four robotic fingers forms a thumb, the device forming a robotic hand comprises exactly two actuators for actuating two intermediate drive shafts respectively so as to drive two rows of articulations respectively, preferably two rows of articulations of at least three articulated structures, including one thumb; this characteristic makes it possible to synchronize the movement of all of the articulated structures, for example in order to grasp cylindrical parts, the device forming the robotic hand comprises exactly six actuators for actuating six intermediate drive shafts respectively so as to drive, respectively, three rows of articulations of at least three articulated structures forming at least three robotic fingers except for the thumb and three articulations of an articulated structure forming a robotic thumb, the measurement means comprise six incremental encoders, the at least one articulation is of the type producing a pivot connection about an axis of bending with respect to the base, the axis of the at least one intermediate shaft being substantially parallel to the bending axis of the at least one articulation, the at least one intermediate drive shaft comprises at least one drive pulley and the at least one drive mechanism comprises at least one receiving pulley, so that the at least one flexible drive link is connected to said pulleys, the at least one intermediate drive shaft and/or the at least one drive pulley and/or the at least one receiving pulley and/or any other rotating element can be mounted on a bearing so as to limit the friction, the device comprises an actuation support, on which the at least one actuator and the at least one intermediate drive shaft are fastened, the support being functionally connected to the base, the at least one actuator and the at least one intermediate drive shaft are inserted and/or fastened in the base, the at least one actuator is an electric motor.

According to a second aspect of the invention, a robot is provided comprising at least one articulated arm, which comprises at least one device forming a robotic hand according to one [or] more of the characteristics of the first aspect of the invention.

BRIEF DESCRIPTION OF THE DRAWINGS

Other characteristics and advantages of the invention will become apparent on reading the detailed description of implementations and embodiments that are in no way limitative, in light of the attached drawings, in which:

FIG. 1 is a kinematic diagram of four articulated structures, each forming a robotic finger, connected to a base of a device forming a robotic hand according to an embodiment;

FIG. 2 is a perspective view of a base and four articulated structures, each forming a robotic finger, connected to a base of a device forming a robotic hand in accordance with FIG. 1;

FIG. 3 is a perspective view of a device forming a robotic hand according to an embodiment comprising four articulated structures, each forming a robotic finger, connected to a base in accordance with FIGS. 1 and 2, and a support intended to comprise actuators and intermediate drive shafts, the support being connected to the base so as to form a forearm;

FIG. 4 is a perspective view of a device forming a robotic hand in accordance with FIG. 3, the support being partially represented and seen through it so as to distinguish some of the actuators, the intermediate drive shafts, the flexible actuation links between said actuators and said shafts and the flexible drive links between said shafts and the base according to an embodiment;

FIG. 5 is a view from above of a support comprising two actuators arranged head to tail and four intermediate drive shafts arranged parallel with respect to one another;

FIG. 6 is a view from the left and horizontally of a device forming a robotic hand in accordance with FIGS. 3 to 5, the support being seen through it, which comprises six actuators and six intermediate drive shafts, which are overlaid in three levels: a first level, a second level and a third level, comprising two actuators and two intermediate drive shafts respectively;

FIG. 7 is a view from the left of a device forming a robotic hand represented diagrammatically and in accordance with FIG. 6, diagrammatically representing the route of flexible drive links between intermediate drive shafts and receiving pulleys mounted on articulations of articulated structures, in particular intended to control the abduction and adduction of the thumb, and the flexion and extension of the other fingers;

FIG. 8 is a view from the right of a device forming a robotic hand represented diagrammatically and in accordance with FIG. 6, diagrammatically representing the route of flexible drive links between intermediate drive shafts and receiving pulleys mounted on articulations of articulated structures, in particular intended to control the flexion and extension of the thumb and the abduction and adduction of the other fingers;

FIG. 9 is a view from above of the device forming a robotic hand in accordance with FIGS. 5 and 6, the support being seen through it so as to show only the second level of actuators and intermediate drive shafts;

FIG. 10 is a view from above of the device forming a robotic hand in accordance with FIGS. 5 and 6, the support being seen through it so as to show only the first level of actuators and intermediate drive shafts;

FIG. 11 is a view from above of the device forming a robotic hand in accordance with FIGS. 5 and 6, the support being seen through it so as to show only the third level of actuators and intermediate drive shafts;

FIG. 12 is a perspective view of two articulations and a structure element connecting the two articulations, the two articulations having axes of rotation not parallel to one another, corresponding to abduction-adduction and flexion-extension axes;

FIG. 13 is a perspective view, from an angle of observation opposite that in FIG. 12, of two articulations and a structure element connecting the two articulations, the two articulations having axes of rotation not parallel to one another, corresponding to abduction-adduction and flexion-extension axes;

FIG. 14 is a view from above of an articulated structure forming a robotic finger comprising four articulations—one abduction-adduction articulation and three flexion-extension articulations—and in particular the receiving pulleys of the drive mechanism and the flexible links cooperating with them;

FIG. 15 is a perspective view of a glove, according to an embodiment, arranged to cover a device forming a robotic hand in accordance with the preceding figures;

FIG. 16 is a perspective view of the device forming a robotic hand in accordance with the preceding figures, moreover comprising a glove in accordance with FIG. 15;

FIG. 17 is a perspective view of two articulations, of which one articulation is equipped with a potentiometer;

FIG. 18 is a graph representing the progression of the angular position of a first phalange of a first finger as a function of time, curve A, and root mean squares of the extensions, in millimetres, of a first finger and of a second finger, curves B and C, as a function of time, so as to illustrate an attempt to grasp an object with two fingers using the method for measuring the extensions of the flexible links.

DETAILED DESCRIPTION

The embodiments which will be described in the following are in no way imitative; it is possible in particular to implement variants of the invention comprising only a selection of characteristics described below, in isolation from the other characteristics described, if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

In particular, all the variants and all the embodiments described can be combined together if there is no objection to this combination from a technical point of view.

FIG. 3 illustrates a device 1 forming a robotic hand comprising a base 100 forming a palm, and four articulated structures 2, 3, 4 and 5 forming fingers, each articulated structure being connected to the base so as to produce a robotic hand, substantially resembling a human hand. The base 100 has a substantially rectangular shape, which has, at a distal end, three fingers 2, 3, 4 arranged one next to another, said fingers, at rest as represented in FIG. 3, extending in the geometric plane defined by the base. In comparison with the human hand, the articulated structures or fingers 2, 3 and 4 correspond to the index finger, the middle finger and the ring finger respectively. The base 100 moreover has, on a palm face 150, an articulated structure 5 forming a thumb, which extends substantially perpendicular to the palm face of the base. The device 1 moreover comprises an actuation support 101 receiving and holding actuation and movement-transmitting means, which will be described below. The actuation support 101 is connected to a proximal end of the base 100 by an articulation. According to the embodiment represented, the articulation between the base 100 and the actuation support 101 is a mechanical bending pivot connection 11. The actuation support 101 thus produces a forearm. According to other embodiments, not represented, the actuation and movement-transmitting means can be inserted in the base.

Figure 1:
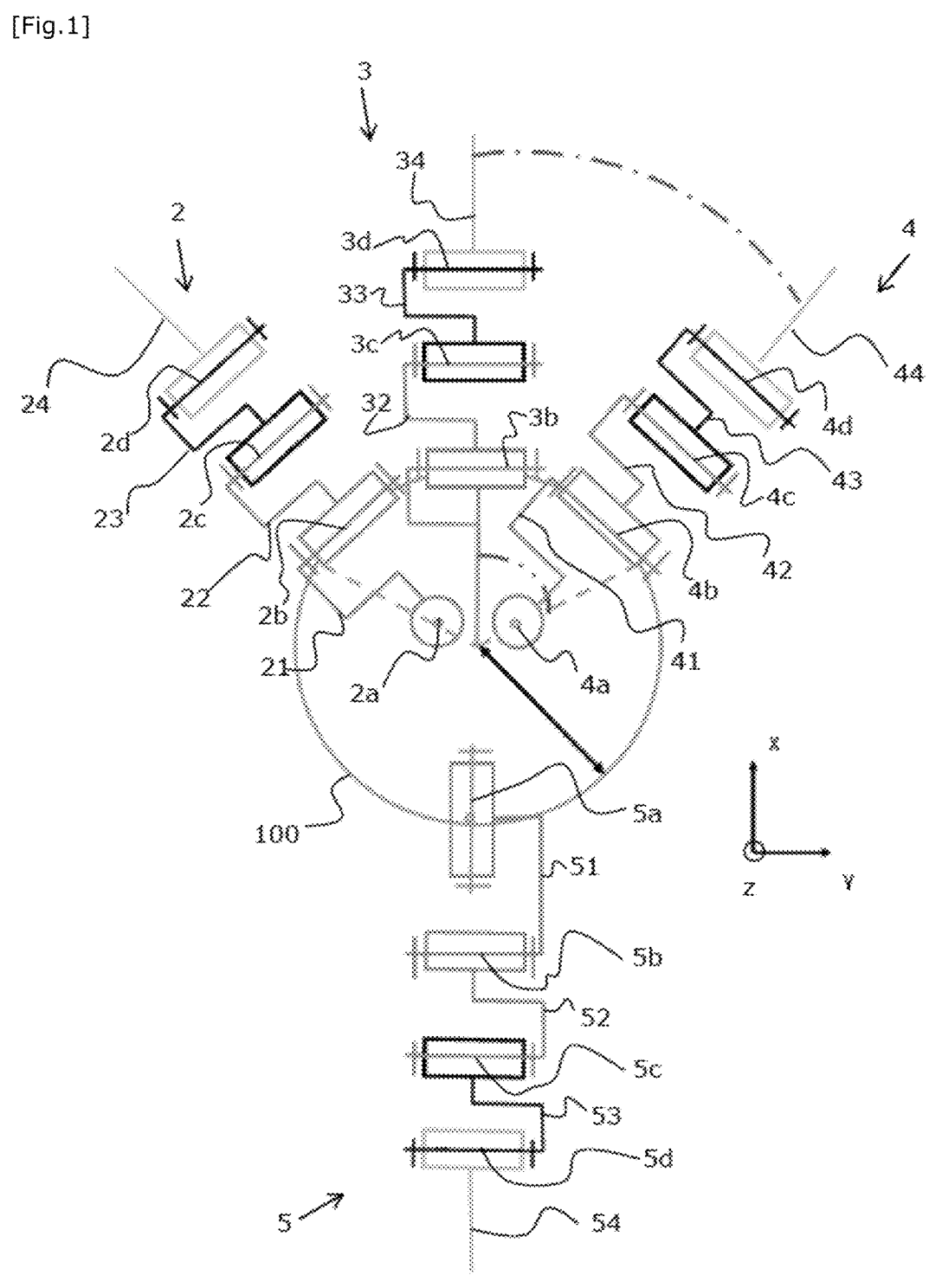

FIGS. 1 and 2 illustrate the degrees of mobility of the articulated structures 2, 3, 4 and 5 with respect to the base

100. Each articulated structure, or finger, comprises structure elements connected to one another by articulations so as to move said articulated structure with respect to the base. In particular, each articulated structure comprises at least one articulation defining a mechanical connection between the base and said articulated structure. Each articulated structure comprises an alternating succession of structure elements and articulations.

Two types of structure element are provided. The device provides, on the one hand, connection structure elements 21, 41 and 51 so as to join two different types of articulation and, on the other hand, ergonomic structure elements so as to form phalanges. With reference to FIGS. 1 and 2, each finger 2, 3, 4 and 5 comprises a first phalange 22, 32, 42, 52, a second phalange 23, 33, 43, 53, and a third phalange 24, 34, 44, 54 respectively.

The device provides two types of articulation: articulations of the abduction-adduction type so as to produce at least one pivoting on the z axis (see FIG. 1), and articulations of the flexion-extension type so as to produce at least one pivoting on the y axis (see FIG. 1). According to the embodiment represented, fifteen articulations are provided for moving the articulated structures with respect to the base. Three articulated structures have four articulations: the thumb 5, the index finger 2 and the ring finger 4. The middle finger 3 has three articulations.

According to the embodiments represented, the thumb 5, the index finger 2 and the ring finger 4 each have an abduction-adduction articulation 2a, 4a, 5a connecting the base 100 to a first proximal end of a connection structure element 21, 41, 51. The abduction-adduction articulations 2a and 4a of the index finger 2 and of the ring finger 4, respectively, are positioned close to the distal end of the base 100 (see FIG. 2). The two abduction-adduction articulations define a row of abduction-adduction articulations. The abduction-adduction articulation 5a is positioned on the palm face 150, see FIG. 3. The middle finger 3 does not have an abduction-adduction articulation according to the embodiment.

Each finger 2, 4, 5 comprises a first flexion-extension articulation 2b, 4b, 5b connecting the distal end of the connection structure element 21, 41, 51 to a proximal end of a first phalange 22, 42, 52. The middle finger 3 also comprises a first flexion-extension articulation 3b connecting the distal end of the base 100 to a proximal end of a first phalange 32. The first flexion-extension articulations define a row of metacarpophalangeal MCP articulations. In particular, the row of metacarpophalangeal MCP articulations comprises the first flexion-extension articulations 2b of the index finger, 3b of the middle finger and 4b of the ring finger, see FIG. 3.

Then, each finger 2, 3, 4 and 5 comprises a second flexion-extension articulation 2c, 3c, 4c, 5c connecting the distal end of the first phalange 22, 32, 42, 52 to a proximal end of a second phalange 23, 33, 43, 53. The second flexion-extension articulations define a row of proximal interphalangeal PIP articulations. In particular, the row of proximal interphalangeal articulations comprises the second flexion-extension articulations 2c of the index finger, 3c of the middle finger and 4c of the ring finger, see FIG. 3.

Finally, each finger 2, 3, 4 and 5 comprises a third flexion-extension articulation 2d, 3d, 4d, 5d connecting the distal end of the second phalange 23, 33, 43, 53 to a proximal end of a third phalange 24, 34, 44, 54. The third flexion-extension articulations define a row of distal interphalangeal DIP articulations. In particular, the row of distal interphalangeal DIP articulations comprises the third flexion-extension articulations 2*d* of the index finger, 3*d* of the middle finger, 4*d* of the ring finger, see FIG. 3.

With reference to FIG. 1, all of the articulations are pivot connections. With regard to the index finger 2 and the ring finger 4, each abduction-adduction articulation 2*a*, 4*a* is produced by a z-axis pivot connection. With regard to the thumb 5, the abduction-adduction articulation 5*a* is produced by an x-axis pivot connection. With regard to the fingers 3 and 5, each flexion-extension articulation is produced by a y-axis pivot connection. With regard to the fingers 2 and 4, each flexion-extension articulation is produced by a y-axis pivot connection, when said fingers, the index finger 2 and the ring finger 4, are parallel to the middle finger 3, as represented for example in FIG. 11.

The device comprises receiving pulleys, also called drive-receiving pulleys, positioned close to the articulations so as to move the structure elements in a pivoting with respect to one another via flexible drive links or cables, see FIGS. 12, 13 and 14. Preferably, each receiving pulley, or drive-receiving pulley, has a groove with a helical shape. This characteristic makes it possible for the flexible link, or cable, to be able to make a complete turn of said pulley without said flexible link, or said cable, being overlaid, and thus makes it possible to maintain a constant winding diameter around said pulley. This characteristic moreover makes it possible to limit the friction of the flexible link with respect to itself and/or with respect to the groove of the pulley.

FIGS. 12 and 13 show a connection structure element 21 bearing an abduction-adduction articulation 2*a* and a flexion-extension articulation 2*b*, of the type provided for the index finger. The connection structure element is the same for the ring finger and for the thumb. The connection structure element 21 is in the form of a support frame 310, the average plane of which extends in a yz plane, at rest, i.e. in a centred position with respect to the extreme abduction and adduction positions. The support frame 310 bears, on its two opposite faces on either side of the yz average plane respectively, the abduction-adduction articulation 2*a*, the axis of rotation of which extends along the z axis, and the flexion-extension articulation 2*b*, the axis of rotation of which extends along the y axis.

The connection structure element moreover comprises a saddle 320 on a first face of the support frame 310. The saddle 320 has a dihedral shape, of which the median thickness plane extends in an xy plane and which rotatably supports two abduction-adduction half-shafts 220, 230 arranged coaxially, the pivot axis 202 of which extends parallel to the z axis. The half-shafts 220, 230 are kept immobile with respect to the saddle 320. The half-shafts 220, 230 are articulated with respect to the base 100, via the bearings, or mountings, 226, 236, such that the connection structure element 21 pivots relative to the base about the axis 202. The connection structure element 21 comprises receiving pulleys, also called drive-receiving pulleys, 325 and 326 arranged in order to each receive a flexible drive link 96, so that the connection structure element 21 is moved in a pivoting about the axis 202 by the flexible link adhering to the pulley.

Preferably, the flexible links are hooked onto the receiving pulleys 325, 326 by respective anchoring points which are diametrically opposite with respect to the axis 202.

As a variant, the flexible drive links can be wound at least partially around the pulleys 325, 326, or even make a complete turn around these pulleys, in respectively opposite directions, and their second ends are fastened on the saddle 320.

In both cases, a person skilled in the art will understand that the rotational displacement of an actuator in one direction applies a pulling effort on the first adduction cable 114 and, by acting on the pulley 325 and/or the saddle 320, leads to a displacement of the finger in an abduction-adduction direction (see the arc of a circle in FIG. 1). Conversely, the rotational displacement of the same actuator in the opposite direction applies a pulling effort on the second abduction cable 112 and, by acting on the pulley 326 and/or the saddle 320, leads to a displacement of the finger in an abduction-adduction direction.

Between the pulleys 325, 326 and the bearings 226, 236, each half-shaft or journal 220, 230 bears a cage 222, 232, each defining a window for the passage and guiding of flexible drive links or cables 96, in particular pairs of cables 122, 124; 132, 134, directed towards the downstream articulations 2*b* and 2*c*. Each cage 222, 232 has two series of cylindrical rotating parts each having a groove, respectively coaxial, in the shape of a bobbin 223, 224 and 233, 234. Each series of bobbin-shaped parts 223, 224 and 233, 234 is centred on a respective z axis. The bobbin parts 223, 224 provided in the cage 222 are symmetrical with respect to the axis 202. Likewise, the bobbin parts 233, 234 provided in the cage 232 are symmetrical with respect to the axis 202.

Each series of bobbin-shaped parts 223, 224 and 233, 234 additionally has a number of bobbin-shaped parts equal to the number of cables to be guided, respectively 122, 132 and 124, 134.

According to the embodiment represented in FIG. 12, each half-shaft or journal 220, 230 guides two flexible drive links or cables 122, 132 and 124, 134. As a result, each series of bobbin-shaped parts 223, 224 and 233, 234 has at least two bobbin-shaped parts stacked axially on the z axis. On the axis 202 of the abduction-adduction movement, a set of at least four bobbins is therefore provided positioned on the upper part of the axis in order to guide at least two cables, and a set of four bobbins (visible portion) on the lower part of the axis in order to guide two cables.

Each pair of two adjacent bobbins belonging to the two series of parts 223, 224 and 233, 234 located in a common cage 222, 232 thus define respective passages intended to receive the flexible drive links intended to move the receiving pulleys. Each cable is thus guided between two rotating bobbins.

Each bobbin is capable of rotating about its axis, on a central hinge pin linked to the cage 222 or 232, in order to limit the friction between the cables and the bobbins.

Once they have passed through the abduction-adduction articulation 2*a*, each of the flexible drive links or cables is thus guided via a bobbin-shaped part 311, 312, 313 and 314 towards the axis of the flexion-extension articulation 2*b*, see FIG. 12.

With reference to FIG. 13, the connection structure element 21 comprises a saddle 320 on a second face of the support frame 310. The saddle 320 has a dihedral shape, of which the median thickness plane extends in an xz plane and which rotatably supports two coaxial flexion-extension half-shafts 420 and 430 extending along a flexion-extension axis 402 of the flexion-extension articulation 2*b*, which is parallel to the y axis, and which is orthogonal to the abduction-adduction axis 202. The two flexion-extension half-shafts 420, 430 are connected rotatably fixed with respect to the saddle 320. The two half-shafts or journals 420, 430 are located on either side of the saddle 320 respectively. The half-shafts each bear a bearing 426, 436 arranged to produce a pivot articulation of the second structure element (not represented), or of the first phalange 22, with respect to the connection structure element 21 such that the first phalange pivots relative to said connection structure element 21. The bearings 426, 436 form rotation-guiding mountings for a clevis 520 (represented in FIG. 14) of the first phalange 22.

The half-shaft 420 bears two receiving pulleys, also called return pulleys, 422, 424, on which flexible drive links or cables are provided respectively in order to be wound by travelling one turn of these pulleys. The other half-shaft 430 bears two other return pulleys 432, 434, on which flexible links or cables are provided respectively in order to be wound by travelling one turn of these pulleys. The return pulleys 422, 424 and 432, 434 are rotationally free with respect to the saddle 320 about the axis 402.

The dead turn of the cables made around the guiding return pulleys 422, 424 and 432, 434, rotationally free about their axis, makes it possible to prevent cables from coming out of the pulleys as a function of the articular configuration of the flexion-extension movement of the phalanges.

The return pulleys make it possible to return four cables originating from the cages 222 and/or 232 towards downstream flexion-extension articulations of the intermediate phalange 23 respectively.

FIG. 14 shows an embodiment of an articulated structure or finger. As indicated previously, all of the fingers of the robotic hand are functionally similar, with the exception of the middle finger 3, which does not comprise an abduction-adduction articulation. For the following and in order to avoid repetition, a single articulated structure is described, using the references of the index finger 2. The articulated structure 2 comprises four structure elements: one connection structure element 21 and three phalanges 22, 23 and 24. Preferably, the articulated structure is actuated by only three actuators (described below). Each structure element is moved via the drive mechanism comprising receiving pulleys and by several pairs of two flexible drive links or cables 112, 114; 122, 124; 132, 134 and 142, 144.

The two branches 522, 524 of the clevis 520 of the first phalange 22 bear receiving pulleys 525, 526 centred on the axis 402, said pulleys guiding the respective second end of the cables 122, 124, which make it possible to move the first abduction-adduction articulation 2b.

The pulleys 525, 526 must be rotationally linked to the clevis 520 if the ends of the cables 122, 124 are fastened on these pulleys.

The pulleys 525 and 526 can be rotationally free with respect to the clevis 520, about the axis 402, if the ends of the cables 122, 124 are fastened not on the above-mentioned pulleys but on the clevis 520.

The two branches 626, 636 of the second phalange 23 bear receiving pulleys 725, 726 centred on the axis 602, said pulleys guiding the respective second end of the cables 132, 134, which make it possible to move the second abduction-adduction articulation 2c.

The two branches 826, 836 of the third phalange 24 bear receiving pulleys 925, 926 centred on the axis 802, said pulleys guiding the respective second end of the joining cables 142, 144, which make it possible to move the third abduction-adduction articulation 2d.

According to an embodiment, the first ends of the cables 142, 144 are fastened to the first phalange 22 upstream of the articulation 2c. Then the cables 142, 144 are wound around the pulleys 622, 632 centred on the axis 602 respectively. The receiving pulleys 622, 632 are rotationally free about the axis 602. The direction of winding of the cable 144 around the pulley 632 is carried out in an opposite direction to the direction of winding of the cable 142 around the pulley 622. Moreover, the cables 142 and 144 cross each other before reaching the pulleys 925, 926; the crossing of the cables 142 and 144 is visible in FIG. 7 but not visible in FIG. 14. During the driving of the articulation 2c (or the pivoting of the phalange 23 relative to the phalange 22) and because of the pull exerted by one or other of the cables 142 or 144, the pulleys 925, 926 are driven to pivot so as to drive the articulation 2d to move. This embodiment makes it possible to avoid the use of an actuator, by using a single actuator for two articulations.

The actuation and drive, or movement-transmitting, means making it possible to move the articulated structures of the robotic hand will now be described.

With reference to FIGS. 6, 7 and 8, the device forming a robotic hand comprises six actuators M1, M2, M3, MP1, MP2 and MP3 for actuating all of the articulations. The six actuators comprise electric motors, preferably gear motors. The actuator M1 is arranged to actuate the articulations of the row of abduction-adduction articulations. The actuator M2 is arranged to actuate the articulations of the row of metacarpophalangeal articulations. The actuator M3 is arranged to actuate the articulations of the row of proximal interphalangeal articulations. The actuator MP1 is arranged to actuate the abduction-adduction articulation of the thumb 5. The actuator MP2 is arranged to actuate the first flexion-extension articulation of the thumb 5. The actuator MP3 is arranged to actuate the second flexion-extension articulation of the thumb 5. The six actuators extend horizontally and are overlaid one above another in two columns of three overlaid actuators. This characteristic makes it possible to improve the compactness of the device forming a robotic hand.

The device 1 forming a robotic hand moreover comprises six intermediate drive shafts 8a, 8b, 8c, 8Pa, 8Pb, 8Pc. The intermediate drive shafts comprise drive pulleys. With the flexible drive links, they contribute to transmitting the rotational movements of the actuators to the receiving pulleys of the articulations, so as to move the robotic hand. In particular, each intermediate drive shaft 8a, 8b, 8c, 8Pa, 8Pb, 8Pc is actuated by a single actuator. With reference to FIGS. 6, 7 and 8, the actuator M1 is associated with the intermediate drive shaft 8a, the actuator M2 is associated with the intermediate drive shaft 8b, the actuator M3 is associated with the intermediate drive shaft 8c, the actuator MP1 is associated with the intermediate drive shaft 8Pa, the actuator MP2 is associated with the intermediate drive shaft 8Pb, the actuator MP3 is associated with the intermediate drive shaft 8Pc.

Each actuator is connected to its intermediate drive shaft by means of a flexible actuation link 98, for example a strap. For example, each actuator and each intermediate drive shaft bears one pulley or one toothed wheel respectively in order to cooperate with a flexible actuation link and thus to transmit the rotational movement of the actuator to the intermediate drive shaft. The intermediate drive shafts extend substantially parallel to one another and parallel to the actuators. They are arranged one next to another such that their positioning, seen laterally, forms a triangle or a diamond and makes a smaller size in terms of height possible. This characteristic makes it possible to give the actuation support a general size that resembles a human forearm. Seen from above, the six intermediate drive shafts are arranged so as to form four columns or four rows: R1, R2, R3 and R4, see FIG. 5. The row R1 comprises the intermediate drive shaft 8a. The row R2 comprises the overlaid intermediate drive shafts 8b and 8c. The row R3 comprises the overlaid intermediate drive shafts 8Pb and 8Pc. The row R4 comprises the intermediate drive shaft 8Pa.

With reference to FIGS. 4, 5, 6, 7, 8, the actuators and the intermediate drive shafts are arranged head to tail. Along each lateral side of the actuation support 101, three actuators are connected to three respective intermediate shafts by means of a flexible actuation link 98, see FIGS. 7 and 8.

The intermediate drive shafts are connected to the articulations of the articulated structures via flexible drive links or cables 96, already described.

Figure 9:
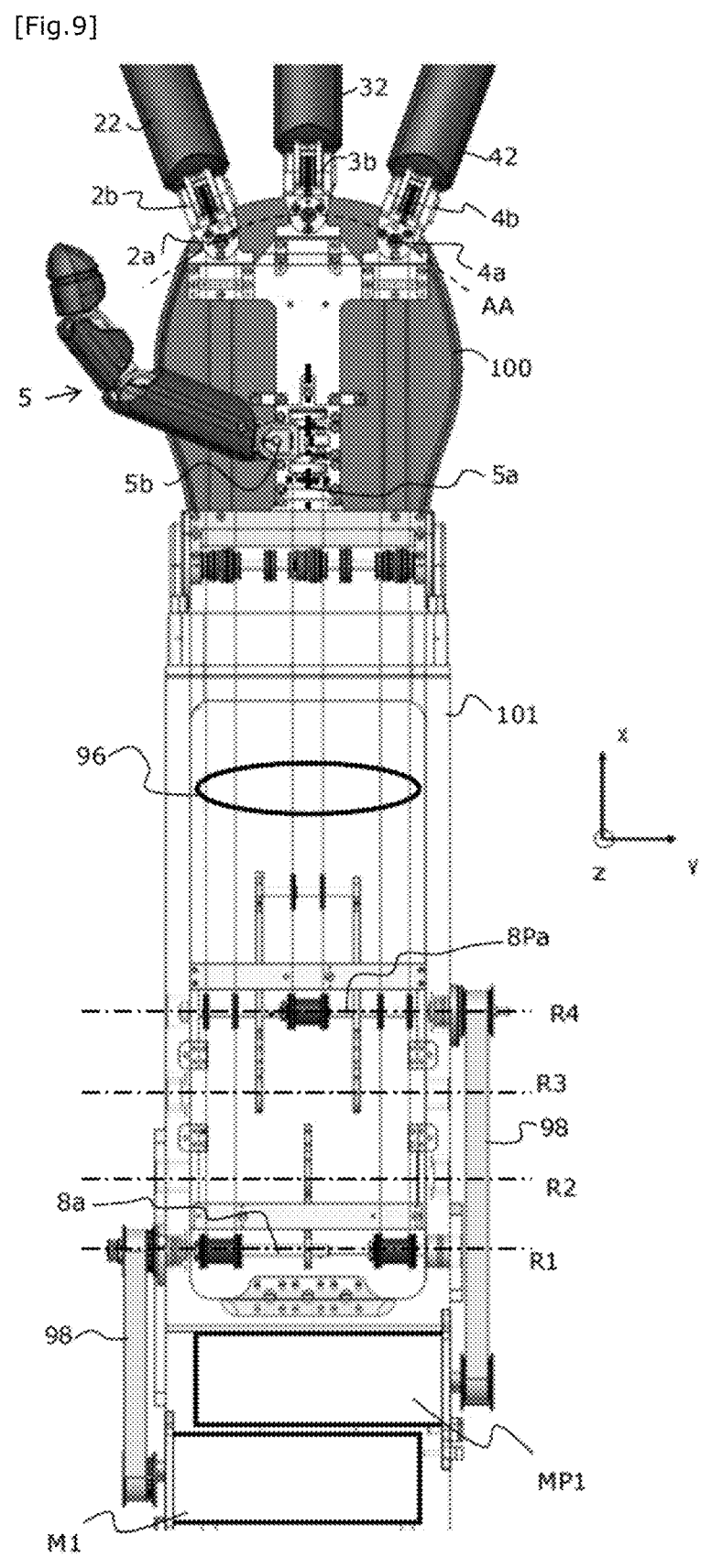

Each intermediate drive shaft 8a, 8b, 8c is connected to a single row of articulations; the other intermediate drive shafts 8Pa, 8Pb, 8Pc are each connected to a single articulation. With reference to FIG. 9, the intermediate drive shaft 8a is connected to the row of abduction-adduction AA articulations comprising the articulations 2a and 4a of the phalanges 22 and 42. The intermediate drive shaft 8a bears two drive pulleys, each having two anchoring points for two flexible drive links, said two flexible links being joined to receiving pulleys 325, 326, described previously. In order to make the index finger and the ring finger move towards each other or move apart synchronously, the flexible drive links joined to the shaft 8a must be arranged symmetrically with respect to a median longitudinal geometric plane parallel to an xz plane. Also visible in FIG. 9, the intermediate drive shaft 8Pa is connected to the abduction-adduction articulation 5a of the thumb. The shaft 8Pa bears a drive pulley having two anchoring points for two flexible drive links which are joined to receiving pulleys 325, 326, described previously.

With reference to FIG. 10, the intermediate drive shaft 8b is connected to the row of metacarpophalangeal MCP articulations 2b, 3b and 4b of the phalanges 22, 32 and 42. The shaft 8b bears three drive pulleys, each having two anchoring points for two flexible drive links, said two flexible links being joined to receiving pulleys 525, 526, described previously. Also visible in FIG. 10, the intermediate drive shaft 8Pb is connected to the flexion-extension articulation 5b of the thumb. The shaft 8Pb bears a drive pulley having two anchoring points for two flexible drive links which are joined to receiving pulleys 525, 526, described previously.

With reference to FIG. 11, the intermediate drive shaft 8c is connected to the row of proximal interphalangeal PIP articulations comprising the articulations 2c, 3c, 4c of the phalanges 23, 33 and 43. The shaft 8c bears three drive pulleys, each having two anchoring points for two flexible drive links, said two flexible links being joined to receiving pulleys 725, 726, described previously. Also visible in FIG. 11, the intermediate drive shaft 8Pc is connected to the flexion-extension articulation 5c of the thumb. The shaft 8Pc bears a drive pulley having two anchoring points for two flexible drive links which are joined to receiving pulleys 725, 726, described previously.

Finally, the actuation of the intermediate drive shaft 8c moreover makes it possible to actuate the row of distal interphalangeal DIP articulations comprising the articulations 2d, 3d, 4d via the flexible joining links or cables 142, 144, described previously. Likewise, the intermediate drive shaft 8Pc makes it possible to actuate the articulation 5d via the flexible joining links 142, 144, described previously. This characteristic makes it possible to synchronize the angular movement of the articulations 2d, 3d, 4d, 5d with the angular movement of the articulations 2c, 3c, 4c, 5c.

Within the framework of a use in an aquatic environment at a great depth, the device 1 forming a robotic hand comprises a glove 102 intended to cover all of the fingers 2, 3, 4 and 5 and the base 100, see FIG. 15. With reference to FIG. 16, when the glove 102 is arranged on the device, the proximal end of said glove is applied to the distal end of the actuation support 101 so as to close the glove and obtain a watertightness between the volume enclosed by the glove and the external environment. Preferably, the glove is fastened on the actuation support 101 by clamping collar 103. The volume comprised between the base and the fingers and the internal wall of the glove is filled with an incompressible fluid, preferably dielectric oil. This characteristic makes it possible to put the device 1 under equal pressure between the inside and the outside of the glove. In addition, the glove has the advantages of being lightweight and not limiting the movements of the fingers. According to an embodiment, the glove can have bellows at the back of the fingers at the level of the articulations.

Moreover, the part of the actuation support 101 holding the intermediate shafts is also closed and filled with dielectric oil. The oil moreover makes it possible to limit the friction between the flexible drive links, or cables, and the pulleys so that the extension measured results only, or mainly, from the grasping effort. According to an embodiment, the actuation support 101 comprises two portions: one portion of intermediate shafts and one portion of actuators which are watertight with respect to one another and watertight with respect to the external environment. The portion of actuators of the actuation support holds the electric motors and the flexible actuation links 98, or straps, and is filled with air. The case forming the actuation support is constituted by materials and parts of the type arranged and configured for immersion in an aquatic environment at a great depth known to a person skilled in the art. Likewise, the watertightness means, for example joints, are of the type arranged and configured for immersion in an aquatic environment at a great depth known to a person skilled in the art.

Preferably and with reference to FIGS. 3 and 4, the device forming a robotic hand comprises several shells, or covers, surrounding the fingers and the base, so as to locally produce a support for the wall of the glove. The shells are rigid parts, for example made of plastic material. With reference to FIG. 3, each finger has three finger shells 104, or covers, each shell 104 surrounding a phalange. Preferably, the finger shells have a rounded shape. The finger shells 104 of the first phalanges and of the second phalanges are placed between every articulation of these latter, without completely covering said articulations so as to make it possible for the phalanges to move. The third phalanges also comprise, respectively, a finger shell 104 which does not cover the common articulation with the second phalange. With reference to FIG. 4, the base comprises a base shell 105 covering the palm face 150 and the face opposite the palm face, without covering the abduction-adduction articulations. According to an embodiment, the finger shells 104 and base shells 105 can be produced in two parts, which can be assembled by screwing or being fitted together.

The calculation of the clamping effort will now be described.

The device forming a robotic hand 1 comprises measurement means in order to determine the extension of the flexible drive links or cables. The measurement means measure the angular displacement of the axes of the actuators and the axes of the articulations. According to the embodiment described, the measurement means comprise six incremental encoders, or optical sensors, each being arranged on a motor axis (not represented), and fifteen potentiometers P, each arranged on an articulation in order to measure the angular displacement between two phalanges, see FIG. 17.

For one articulation, the angular difference between the measurement of an encoder and the measurement of the potentiometer associated with said articulation makes it possible to deduce the extension of the cable. For example with reference to FIG. 14, the cables 132, 134 actuate the proximal interphalangeal articulation 2c cooperating respectively with an intermediate pulley located at the level of the axis 402 of the metacarpophalangeal articulation 2b, which drives a coupling between these two articulations. In order to take this coupling into account, but also the possible differences in diameter between the intermediate pulley (driving) and the receiving pulley that it drives, it is necessary to determine the coupling matrix taking the diameters of the pulleys into account.

Considering that each cable behaves like a linear spring, and knowing the elastic constant (rigidity constant or coefficient, denoted k) of the cable, it is possible to calculate the pulling effort (denoted F) experienced by the cable using the equation: $F = k \cdot x$; x being the calculated extension. Taking into account the matrix of pairs, the different articulations and the diameters of the pulleys, it is possible to calculate the clamping effort produced by the device 1. The calculations of extension and of efforts are carried out by control means, not represented.

Preferably, the flexible drive links or cables are thermoplastic wires, for example comprising a polymeric material, the extension of which is reproducible. For example, the flexible drive links or cables are constituted by the material "vectran" and have a diameter of 0.7 millimetres. The rigidity coefficient is for example 15,000 N/m.

FIG. 18 describes an attempt to grasp an object, the grasping being broken down into four phases, and presents three curves: curve B shows the progression of the quadratic sum of the extensions of the four cables of the index finger 2, curve C shows the progression of the quadratic sum of the extensions of the four cables of the thumb 5, and curve A shows the progression of the angular position of the MCP articulation (flexion-extension 2b) of the index finger. During this attempt, this articulation was the only one to move.

During a first phase, called the moving-together phase P1, the first phalange pivots and the extensions are zero or negligible until the index finger is in contact with the object. During a second phase, called the contact phase P2, the first phalange continues to pivot at a linear rate and the quadratic sum of the extensions of the index finger increases because the contact with the object persists due to a growing pressing on said object. This second phase ends with the increase in the quadratic sum of the extensions of the thumb from an almost zero value, corresponding to the contact of the thumb with the object. Then, during a third phase called the clamping phase P3, the first phalange still continues to pivot at a linear rate and the quadratic sums of the extensions of the index finger and of the thumb increase respectively so that the two fingers press against said object and exert an increasing effort on it. This third phase ends when the displacement of the first phalange stops. Finally, during a fourth phase, called the grasping phase P4, the first phalange remains immobile and the quadratic sums of the extensions of the index finger and of the thumb respectively remain constant.

Thanks to the measurement of the extensions of the cables, it is possible to detect the contact of an object by one or more fingers successively or simultaneously, and to evaluate the clamping effort on said object. The value of the quadratic sums of the extensions of the cables during this clamping phase and knowing the elastic (or tensile) constant make it possible to determine the efforts applied by each of the fingers to the object under consideration.

This method has the advantage of dispensing with sensors that are not resistant to pressure and of not being limited by the immersion depth.

The invention claimed is:

1. A device forming a robotic hand, comprising:
   a base forming a hand palm;
   at least two articulated structures each forming a robotic finger, each articulated structure being functionally connected to the base and comprising at least one articulation, so as to move said articulated structure with respect to the base;
   at least one drive mechanism for moving each articulation;
   at least one actuator arranged to actuate the at least one drive mechanism by means of at least one flexible drive link connecting and driving the at least one drive mechanism;
   means for measuring the pivoting of the at least one actuator and one or more of said articulations, said means being used to determine the elongation of the at least one flexible drive link; and
   a glove covering the base and the at least two articulated structures, the glove being closed so as to form, inside said glove, a volume filled with oil between the wall of the glove and the base and the at least two articulated structures.

2. The device according to claim 1, characterized in that the measurement means comprise an incremental encoder arranged on each actuator.

3. The device according to claim 1, characterized in that the measurement means comprise a potentiometer arranged on each axis of articulation.

4. The device according to claim 1, characterized in that the glove is produced with a material containing silicone.

5. The device according to claim 1, characterized in that the device comprises at least one shell having a rounded shape and placed between each articulation of the at least one articulated structure, so as to locally produce a support for the wall of the glove.

6. The device according to claim 1, characterized in that the device comprises at least one intermediate drive shaft in order to return the movement of the at least one actuator, arranged functionally between the at least one actuator and the at least one actuated drive mechanism, so that:
   the at least one intermediate drive shaft is actuated by an actuator, and
   the at least one intermediate drive shaft is functionally connected to at least two distinct drive mechanisms, each drive mechanism being functionally connected to said intermediate drive shaft by means of the at least one flexible drive link.

7. The device according to claim 6, characterized in that at least one intermediate drive shaft is functionally connected to at least two drive mechanisms, each mechanism being arranged functionally on a distinct articulated structure.

8. The device according to claim 6, characterized in that the at least two articulated structures each comprise at least two structure elements and at least two articulations of different types and/or with different functions, which are functionally connected to one another in order to form a robotic finger with at least two articulations, and in that the at least one intermediate drive shaft is functionally connected to at least two drive mechanisms associated with an articulation of the same type and/or with the same function, each mechanism being arranged on a distinct articulated structure.

9. The device according to claim 6, characterized in that the at least one actuator comprises an axis of rotation which is parallel to and non-coaxial with the axis of the at least one intermediate drive shaft, so that each intermediate drive shaft is actuated by an actuator by means of at least one flexible actuation link.

10. The device according to claim 6, characterized in that the at least one intermediate drive shaft comprises at least one drive pulley and the at least one drive mechanism comprises at least one receiving pulley, so that the at least one flexible drive link is connected to said pulleys.

11. The device according to claim 6, characterized in that the device comprises a support on which the at least one actuator and the at least one intermediate drive shaft are fastened, the support being functionally connected to the base.

12. A robot comprising at least one articulated arm, which comprises at least one device forming a robotic hand according to claim 1.

* * * * *